Figure 1:
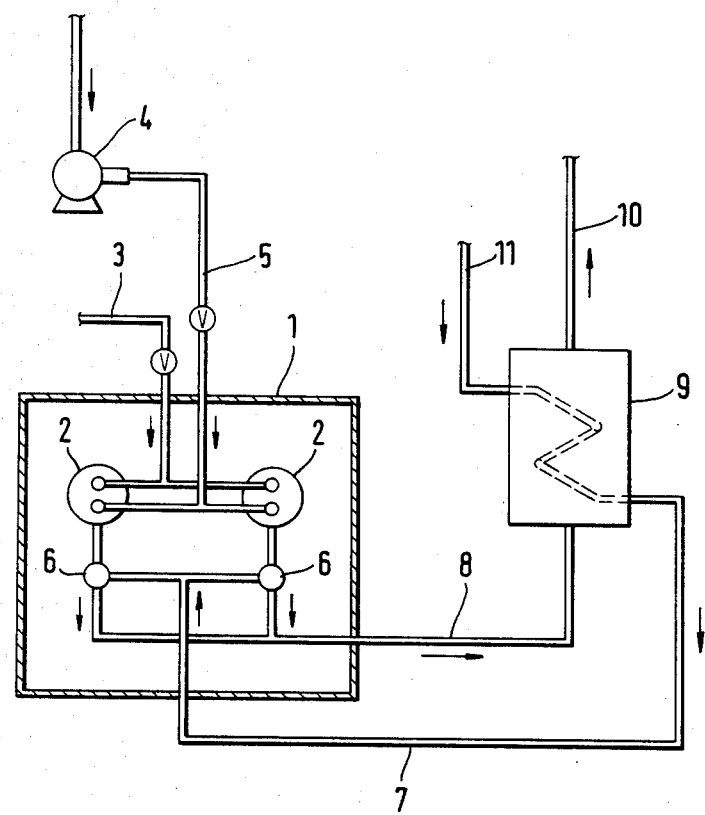

United States Patent [19]

Kühn

[11] Patent Number: 4,545,208

[45] Date of Patent: Oct. 8, 1985

[54] METHOD OF OPERATING AN INDUSTRIAL FURNACE

[75] Inventor: Friedhelm Kühn, Mülheim, Fed. Rep. of Germany

[73] Assignee: Ruhrgas Aktiengesellschaft, Essen, Fed. Rep. of Germany

[21] Appl. No.: 589,113

[22] PCT Filed: Jun. 25, 1983

[86] PCT No.: PCT/DE83/00115

§ 371 Date: Feb. 29, 1984

§ 102(e) Date: Feb. 29, 1984

[87] PCT Pub. No.: WO84/00206

PCT Pub. Date: Jan. 19, 1984

[30] Foreign Application Priority Data

Jul. 1, 1982 [DE] Fed. Rep. of Germany ....... 3224571

[51] Int. Cl.$^4$ .............................................. F01K 17/00
[52] U.S. Cl. ........................................ 60/648; 60/676; 60/689; 122/31 R
[58] Field of Search ................ 60/648, 656, 672, 676, 60/681, 689; 122/5.5 A, 31 R

[56] References Cited

U.S. PATENT DOCUMENTS 4,422,299 12/1983 Sorensen ............................... 60/681

FOREIGN PATENT DOCUMENTS

| 897467 | 11/1953 | Fed. Rep. of Germany . |
| 1162391 | 2/1964 | Fed. Rep. of Germany . |
| 2759286 | 7/1979 | Fed. Rep. of Germany . |
| 3018368 | 11/1980 | Fed. Rep. of Germany . |
| 428560 | 9/1911 | France . |
| 1380735 | 10/1964 | France . |
| 2353709 | 12/1977 | France . |
| 465146 | 12/1968 | Switzerland . |

Primary Examiner—Stephen F. Husar
Attorney, Agent, or Firm—Beall Law Offices

[57] ABSTRACT

The disclosure relates to a method of operating an industrial furnace which is heated by recuperator burners from which the exhaust gases are extracted via steam jet injectors. The exhaust gas-steam mixture from the steam jet injectors passes into a waste heat boiler in order to produce water vapor. This water vapor is delivered to the steam jet injectors in order to drive them. When water vapor is produced in excess, preliminary expansion can be carried out in a turbine in order to generate useful energy. Such conditions are produced in particular when the industrial furnace operates with a steam generating water cooling system for parts of the furnace which become hot. The resulting water vapor is then also led through the waste heat boiler. The useful energy occurring in the turbine can serve to drive the blower for the combustion air for the recuperator burners.

16 Claims, 2 Drawing Figures

METHOD OF OPERATING AN INDUSTRIAL FURNACE

The invention relates to a method of operating an industrial furnace which is heated by recuperator burners from which the exhaust gases are extracted via injectors.

Such methods aim to use recuperator burners of compact construction which produce a high pressure loss and thus permit a high degree of pyrotechnic efficiency. The injectors extracting the exhaust gases serve to overcome this high pressure loss.

In the past air jet injectors were used, but their effectiveness is limited, quite apart from the fact that additional power is necessary for the production of the injector air.

The object of the invention is to improve the methods referred to in the introduction in such a way that the necessary energy costs are reduced and the degree of pyrotechnic efficiency is increased.

In order to achieve this object the method according to the invention is characterised in that the exhaust gases from the recuperator burners are extracted via steam jet injectors and that the exhaust gas-steam mixture coming from the steam jet injectors is supplied to a waste heat boiler in order to produce water vapour, the water vapour produced in the waste heat boiler serving to drive the steam jet injectors.

The steam jet injectors are capable of overcoming an extremely high pressure loss from the recuperator burners without the necessity of an additional blower. Thus the recuperator burners can be of particularly compact construction and can operate with a correspondingly high degree of pyrotechnic efficiency. Additional energy is not required. On the contrary the waste heat from the industrial furnace is used.

Particularly favourable conditions are produced by passing the exhaust gas-steam mixture from the waste heat boiler through a condensate separator where it is cooled by fresh water flowing in. The recuperator burners utilise the net calorific value of the heating gas, whilst the heat of condensation is recovered in the condensate separator and passed to the fresh water. In addition, the condensate can be mixed with the fresh water so that further heat recovery is also possible here.

According to a further particularly advantageous feature of the invention, when a steam generating water cooling system is used for parts of the industrial furnace which become hot the steam resulting from the water cooling is also supplied to the waste heat boiler. In this way the pressure loss to be overcome in the recuperator burners and thus the degree of pyrotechnic efficiency of the burners can be further increased.

Under these conditions there is also the possibility that the energy supplied to the waste heat boiler exceeds the requirement of the steam jet injectors. In this case the invention proposes that the water vapour generated in the waste heat boiler is expanded in a turbine before it serves to drive the steam jet injectors. Thus the method supplies additional energy from the waste heat of the industrial furnace and this can be used elsewhere.

The steam turbine preferably drives a generator which supplies the current for a blower acting on the recuperator burners. As a rule such a blower is necessary in order to generate the primary air for the recuperator burners. The power requirement for this blower, which in the past was met from a separate source, is now taken from the waste heat from the industrial furnace.

In order to be able to use the advantages of the invention when the industrial furnace is put into operation, the waste heat boiler is heater during the starting phase of the industrial furnace by auxiliary heating means. This auxiliary heating means does use external power, but on the other hand the energy saving achieved is higher.

Figure 2:
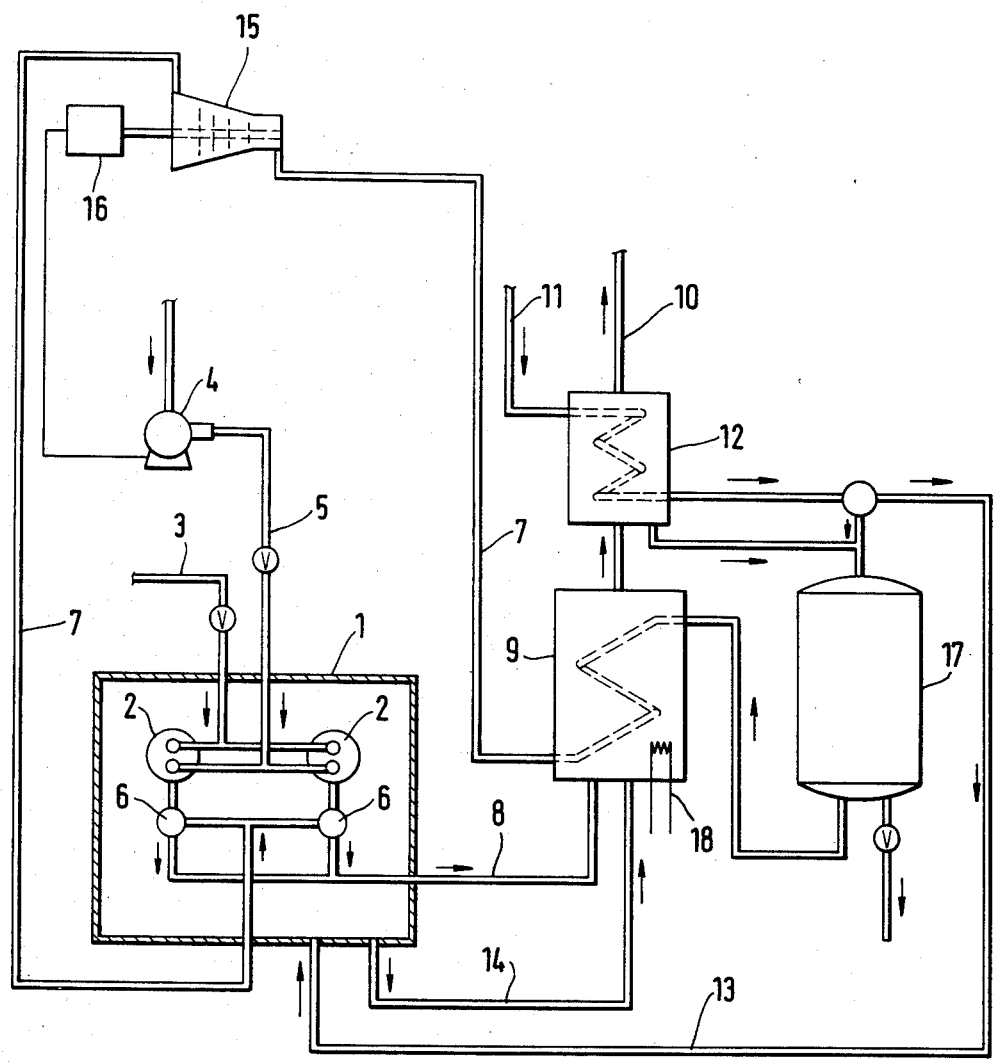

The invention is described in greater detail below on the basis of preferred embodiments with reference to the accompanying drawings, in which:

FIG. 1 shows a first embodiment;
FIG. 2 shows a second embodiment.

According to FIG. 1 an industrial furnace 1 is provided which is heated by recuperator burners 2. The latter are supplied with gas via duct 3. In addition a blower 4 is provided which supplies primary air via a duct 5 to the recuperator burners 2.

The exhaust gases from the recuperator burners 2 are extracted via steam jet injectors 6 to which water vapour is delivered through a duct 7. The exhaust gas-steam mixture coming from the steam jet injectors passes through a duct 8 to a waste heat boiler 9 and from there through a duct 10 to a waste gas flue which is not shown. The waste heat boiler 9 serves to deliver the fresh water flowing in through a pipe 11 to the duct 7 as water vapour to supply the steam jet injectors 6.

The embodiment according to FIG. 2 differs from that of FIG. 1 principally in that the industrial furnace 1 is provided with a steam generating cooling system for parts which become hot.

The fresh water flowing in through the pipe 11 is passed through a condensate separator 12 arranged after the waste heat boiler 9 and then passes through a duct 13 into the industrial furnace 1. The steam produced in the water cooling is led through a duct 14 into the waste heat boiler 9.

It would now be possible for the quantity of energy which has been increased in this way to be led through the duct 7 from the waste heat boiler 9 directly to the steam jet injectors 6.

However, in the present case so much water vapour is generated in the waste heat boiler 9 that the duct 7 can first lead to a turbine 15 in which the water vapour is expanded in order to produce additional useful energy. The turbine 15 is connected to a generator 16 which supplies the current for the blower 4.

FIG. 2 also shows a storage tank 17 into which both fresh water from the condensate separator 12 and condensate originating from the latter pass. The storage tank 17 supplies the pipe coil leading through the waste heat boiler 9.

The waste heat boiler 9 is also provided with an auxiliary heating means 18 which remains switched on during the starting of the industrial furnace 1 until the latter supplies a sufficient quantity of waste heat via the ducts 8 and 14.

I claim:

1. The method of operating an industrial furnace which is heated by recuperator burners from which the exhaust gases are extracted via injectors, comprising:
   extracting the exhaust gases from said burners via steam injectors,
   exhausting the exhaust gas-steam mixture through a waste heat boiler to produce water vapor therein, and supplying said water vapor to drive said steam injectors.

2. The method of claim 1, further comprising the step of passing said exhaust gas-steam mixture from said waste heat boiler through a condensate separator where said mixture gives up further heat to fresh water flowing therethrough.

3. The method of claim 1 wherein said industrial furnace further includes a steam generating water cooling system for parts of the furnace that become hot, said method further comprising the step of supplying said waste heat boiler with the steam generated by said cooling system.

4. The method of claim 3 further comprising the step of expanding said water vapor generated in said waste heat boiler in a turbine before it serves to drive said steam jet injectors.

5. The method of claim 4 further comprising the step of driving a generator with said steam turbine, said generator supplying current for a blower to supply primary air to said recuperator burners.

6. The method of claim 1 further comprising the step of heating said waste heat boiler by auxilliary heating means during the starting phase of said furnace.

7. The method of claim 2 wherein said industrial furnace further includes a steam generating water cooling system for parts of the furnace that become hot, said method further comprising the step of supplying said waste heat boiler with the steam generated by said cooling system.

8. The method of claim 7 further comprising the step of expanding said water vapor generated in said waste heat boiler in a turbine before it serves to drive said steam jet injectors .

9. The method of claim 8 further comprising the step of driving a generator with said steam turbine, said generator supplying current for a blower to supply primary air to said recuperator burners.

10. The method of claim 2 further comprising the step of heating said waste heat boiler by auxilliary heating meand during the starting phase of said furnace.

11. The method of claim 3 further comprising the step of heating said waste heat boiler by auxilliary heating means during the starting phase of said furnace.

12. The method of claim 4 further comprising the step of heating said waste heat boiler by auxilliary heating means during the starting phase of said furnace.

13. The method of claim 5 further comprising the step of heating said waste heat boileer by auxilliary heating means during the starting phase of said furnace.

14. The method of claim 7 further comprising the step of heating said waste heat boiler by auxilliary heating means during the starting phase of said furnace.

15. The method of claim 8 further comprising the step of heating said waste heat boiler by auxilliary heating means during the starting phase of said furnace.

16. The method of claim 9 further comprising the step of heating said waste heat boiler by auxilliary heating means during the starting phase of said furnace.

* * * * *